United States Patent Office 3,492,832
Patented Feb. 3, 1970

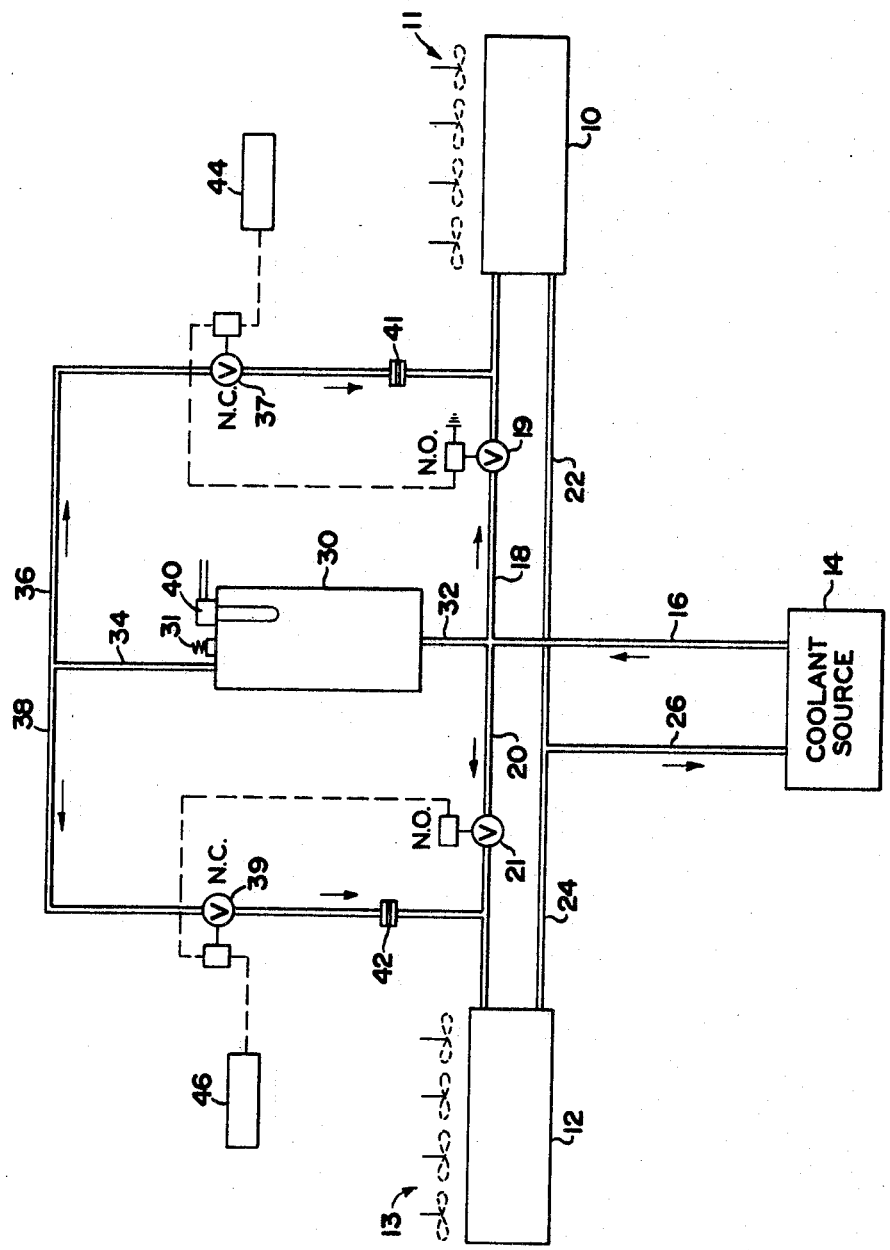

3,492,832
METHOD AND APPARATUS FOR DEFROSTING COOLING COILS
Noel Davis, Russell Township, and Carl E. Merchant, Mentor, Ohio, assignors to Integrated Development and Manufacturing Co., Chagrin Falls, Ohio, a corporation of Ohio
Filed Apr. 29, 1968, Ser. No. 724,982
Int. Cl. F25d 21/06
U.S. Cl. 62—80          6 Claims

ABSTRACT OF THE DISCLOSURE

A method and apparatus for defrosting a refrigeration coil by withdrawing a portion of coolant and slowly heating it to a temperature above freezing and periodically permitting the heated coolant to flow through the coil.

---

The present invention is directed toward the cooling art and, more particularly, to an improved method and apparatus for defrosting cooling coils.

The invention is especially suited for use in defrosting the cooling coils in environmental growth chambers and will be described with particular reference thereto; however, it will be appreciated the invention is capable of broader application and could be utilized for defrosting the cooling coils in many types of apparatus.

Environmental growth chambers are well insulated chambers provided with condition modifying apparatus for mantaining closely controlled conditions of temperature, humidity, light and air flow therein. The chambers are used for conducting experiments and research on photosynthesis, plant and animal growth, etc., and, as a consequence, the condition modifying apparatus must be capable of maintaining the environmental variables very exact over extended periods of time.

In chambers of the type utilized for conducting experiments at relatively low temperatures, e.g., in range of 0° F. to 50° F., space and equipment limitations, as well as a desire for rapid temperature modifying response, necessitate the use of cooling coils and coolant at a temperature below the freezing point of water. As a result, problems are encountered with frosting of the cooling coils. This, as can be readily understood, makes it difficult to maintain the temperature within the chamber at the desired point because the build-up of frost on the coils forms an insulation barrier which impedes heat transfer.

Many different approaches have been utilized for defrosting the cooling coils of environmental growth chambers. For example, radiant heaters have been positioned adjacent the coils and actuated at various times to melt the frost from the coils. Another approach has been to discontinue coolant flow to the coils and permit continued air flow over the coils to melt the frost. One additional method was to position a large electrical heating coil in the coolant supply line. This coil was turned on at periodic intervals to heat the coolant being supplied to a temperature above the freezing point of water to thereby heat the cooling coil and melt the frost.

In general, the above-noted approaches were unsatisfactory. The radiant heaters, although performing the defrosting relatively rapidly, introduced a substantial amount of heat into the chamber and unduly upset the temperature level therein. The method of simply stopping the coolant flow also resulted in unduly upsetting temperature level in the chamber because of the extended period of timed uring which coolant flow was stopped. Th electric heating coil in the coolant supply line, while giving rapid defrosting with a minimum of disturbance of the temperature level in the chamber, required a heating coil unit of large size and high cost.

The present invention provides an improved method and apparatus for defrosting a cooling coil which overcomes the above-noted problems and permits the cooling coil to be rapidly and effectively defrosted in a minimum of time without any substantial disturbance to the chamber temperature level.

In accordance with one aspect of the present invention there is provided an improved method of defrosting a cooling coil of the type wherein liquid coolant at a first temperature below the freezing point of water is supplied from a source of coolant through a supply line to the coil for circulation therethrough. The method comprises the steps of:

(1) Providing, between said source and said coil and in parallel with said supply line, a fluid receiving chamber having an inlet and an outlet;

(2) Periodically admitting fluid from said source to said chamber;

(3) Blocking the outlet from said chamber and heating the fluid therein to a second temperature substantially above the freezing point of water while continuing to supply coolant at said first temperature from said source to said coil; and, (4) When said fluid in said chamber is at said second temperature, discontinuing the flow of fluid at said first temperature to said coil and unblocking the outlet from said chamber to thereby permit said fluid at said second temperature to pass through said coil to heat said coil and melt frost therefrom.

In accordance with another aspect of the invention improved defrosting means are provided in a cooling apparatus of the type including a cooling coil to which fluid at a first temperature below the freezing point of water is supplied through a supply line from a source of fluid at said first temperature. The improved means include: first means providing a fluid chamber provided with heating means having an inlet and an outlet; first conduit means communicating said inlet with said source of fluid; second conduit means connecting the outlet with said coil and, means for alternately supplying the fluid directly from said source to said coil and or from said source to said chamber and thence to said coil.

As can be appreciated, the periods at which defrosting must be accomplished are relatively widely spaced in most installations. Consequently, the heating of the withdrawn coolant can be performed comparatively slowly by a low wattage, continuously operated heater. Additionally, by connecting the coolant supply directly to the chamber and merely opening and closing the chamber outlet, the pump or other means pumping the coolant from the source functions to fill the chamber and force the heated coolant therefrom through the coil. This makes the system even more economical.

Accordingly, a primary object is the provision of an improved method and apparatus for defrosting cooling coils.

Another object is the provision of a method of defrosting a cooling coil in a manner which minimizes the quantity of heat added to the air being cooled by the coil.

A further object is the provision of apparatus which is capable of rapidly defrosting a cooling coil without the use of large heating units.

Yet another object of the invention is the provision of apparatus which provides automatic defrosting simply and economically.

A still further object is the provision of apparatus which permits defrosting of a cooling coil or refrigeration unit to be accomplished with a minimum of disturbance of the temperature level in the space being cooled.

These and other objects and advantages will become apparent from the following description when read in conjunction with the accompanying drawing wherein the single figure illustrates, somewhat diagrammatically, a preferred embodiment of the invention.

Specifically, the system shown in the figure includes a pair of heat exchangers 10 and 12 across which the air to be cooled is conducted by fans 11 and 13. The heat exchangers can be of any conventional type, for example, the standard coil or plate types. A liquid coolant, such as glycol, is supplied to the heat exchangers 10 and 12 from a coolant source 14 at a temperature below freezing. As shown, the coolant source 14 is connected with heat exchangers 10 and 12 through supply lines 16, 18 and 20. The lines 18 and 20 are each provided with valves 19 and 21, respectively. The valves could be of many types but are shown as conventional normally open solenoid valves.

After passing through the heat exchangers 10 and 12, the coolant is returned to the coolant source through lines 22 and 24, respecitvely to line 26.

The portion of the system thus far described is conventionaly and often used in environmental growth chambers. Because the heat exchangers 10 and 12 are at a temperature below the freezing point of water, the continuous flow of air across the coils causes the moisture in the air to be condensed on the coil and frozen thereon in the form of frost. As is well known, the frost build-up inhibits the rate of heat transfer and, if permitted to build up enough will block the flow of air across the heat exchangers. In environmental growth chambers this problem is especially acute since even the slightest variations in temperature in the chamber can lead to unuseable test results. Prior to the present invention it has been the practice to remove the frost build-up by a variety of different methods as previously discussed. These prior methods were all generally unsatisfactory.

In accordance with the present invention defrosting of the heat exchangers 10 and 12 is accomplished by connecting a coolant receiving chamber 30 in parallel with the supply lines 18 and 20. Preferably, the chamber is fairly well insulated and provided with a pressure relief valve 31. As shown, the chamber 30 is connected by line 32 to the juncture of lines 18 and 20 and has its outlet connected through lines 34, 36 and 38 back to the respective lines 18 and 20. Each of lines 36 and 38 are provided with a valve 37 and 39, respectively. The valves could be manually operated but are preferably normally closed solenoid valves.

As can be appreciated, chamber 30 will fill with coolant during the periods that valves 37 and 39 are open and coolant is being supplied to the heat exchangers 10 and 12 through chamber 30. Associated with chamber 30 are means to heat the liquid which is received therein. These heating means could take a variety of forms but are preferably in the form of a relatively low wattage, submergible-type electric heating unit 40. Consequently, fluid confined within chamber 30 is heated substantially. This fluid is then used to defrost the coils 10 and 12 by being permitted to flow through the coils 10 and 12 to heat them and melt the frost which has collected thereon. Specifically, the structure shown, would preferably be operated in the following manner. First, on start-up of the system, 19, 21, 37 and 39 would all be opened and chamber 30 permitted to fill. Thereafter, valves 37 and 39 would be closed. Consequently, the fluid within chamber 30 is heated to a temperature substanitally above freezing. However, the chilled coolant from source 14 continues to flow through lines 18 and 20 to satisfy the needs of coils 10 and 12. After a predetermined period of time or whenever the frost buildup becomes undesirable, valves 19 and 21 are closed, and valves 37 and 39 are opened. Consequently, the coolant coming from source 14 acts to force the heated coolant in chamber 30 through the lines 36 and 38 to the respective cooling coils 10 and 12 to melt the frost therefrom.

Preferably, the rate of flow of the heated fluid from chamber 30 is regulated to flow through the coil relatively slowly. Any of a variety of flow regulating means could be utilized; however, in the preferred embodiment orifice plates 41 and 42, positioned in lines 36 and 38 respectively function to control this flow. By maintaining the flow of the heated fluid through the coils at a relatively slow rate a minimum amount of heated coolant is required to melt the frost accumulation from the coils This permits the size of chamber 30 to be maintained relatively small.

Although, as mentioned, the valves 19, 21, 37 and 39 can be manually operated, it is more desirable if actuation is automatic. For example, as shown in the figure, each set of valves 19, 37 and 21, 39 can be provided with a conventional mechanical timer 44, 46 respectively, connected to make and break the electrical circuits to the valves. Consequently, the timers can provide any predetermined defrost cycle. Obviously, the same timer could control both sets of valves if desired. Additionally, the timers could be replaced by manual switches, frost build-up sensors, etc.

Although the invention has been described with reference to a specific structural embodiment, modifications and alterations will occur to others upon a reading and understanding of the invention. For example, separate chambers 30 could be provided for each heat exchanger, or one chamber could be used to defrost a large number of coils simultaneously or alternately. Accordingly, it is as part of our invention insofar as they come within the scope of the appended claims.

Having thus described our invention, we claim:

1. A method of defrosting a cooling coil of the type wherein liquid coolant is supplied at a first temperature below the freezing point of water from a source of coolant through a supply line to the coil for circulation therethrough comprising the steps of:
    (1) providing, between said source and said coil and in parallel with said supply line, a fluid receiving chamber having an inlet and an outlet;
    (2) periodically admitting fluid from said source to said chamber;
    (3) blocking the outlet from said chamber and heating the fluid therein to a second temperature substantially above the freezing point of water while continuing to supply coolant at said first temperature from said source to said coil; and,
    (4) when said fluid in said chamber is at said second temperature, discontinuing the flow of fluid at said first temperature to said coil and unblocking the outlet from said chamber to thereby permit said fluid at said second temperature to pass through said coil to heat said coil and melt frost therefrom; including throttling the flow of heated coolant from said chamber.

2. The method as defined in claim 1 including causing the heated coolant to flow from said chamber by connecting the source thereto.

3. In a cooling apparatus of the type including a cooling coil to which fluid at a first temperature below the freezing point of water is supplied under pressure through a supply line from a source of said fluid, improved defrosting means including:
    first means providing a fluid chamber provided with heating means having an inlet and an outlet;
    first conduit means communicating said inlet with said source of fluid;
    second conduit means connecting the outlet with said coil and,
    means for alternately supplying the fluid directly from said source to said coil and or from said source to said chamber and thence to said coil; and, means for throttling the flow of heat coolant from said chamber to said coil.

4. The improved apparatus, as defined in claim 3 wherein the alternate supply means includes valves for simultaneously stopping flow of coolant at said first temperature to said coil and permitting flow of heated coolant from said chamber to said coil.

5. The improvement as defined in claim 3 including means operating said valves at predetermined time intervals.

6. The improvement as defined in claim 3 including means responsive to a predetermined condition for actuating said means for alternately supplying the coolant.

References Cited

UNITED STATES PATENTS

| | | | |
|---|---|---|---|
| 2,554,848 | 5/1951 | Warren | 62—81 |
| 2,630,685 | 3/1953 | Lewis | 62—275 |
| 2,632,304 | 3/1953 | White | 62—276 |
| 2,635,433 | 4/1953 | Schordine | 62—275 |
| 2,713,249 | 7/1955 | Schordine | 62—275 |
| 3,240,028 | 3/1966 | Redfern | 62—156 |

WILLIAM J. WYE, Primary Examiner

U.S. Cl. X.R.

62—81, 156, 234, 276